(12) United States Patent
Bartnick (10) Patent No.: US 8,443,491 B2
(45) Date of Patent: May 21, 2013

(54) PIVOTING ASSIST HANDLE

(75) Inventor: Brian K. Bartnick, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 493 days.

(21) Appl. No.: 12/785,787

(22) Filed: May 24, 2010

(65) Prior Publication Data

US 2011/0285160 A1    Nov. 24, 2011

(51) Int. Cl.
*H01M 2/10*    (2006.01)

(52) U.S. Cl.
USPC .................................. 16/438; 16/445; 16/386

(58) Field of Classification Search
USPC ................ 16/110.1, 422, 426, 431, 444, 445, 16/446, 436, 438, 429, 386; 296/1.02
See application file for complete search history.

(56) References Cited

U.S. PATENT DOCUMENTS

| | | | | |
|---|---|---|---|---|
| 1,484,536 | A * | 2/1924 | Way Alban | 16/386 |
| 5,449,054 | A | 9/1995 | Wiese et al. | |
| 5,461,755 | A * | 10/1995 | Hardigg et al. | 16/438 |
| 6,076,233 | A * | 6/2000 | Sasaki et al. | 16/445 |
| 6,662,683 | B1 | 12/2003 | Takahashi et al. | |
| 6,708,371 | B2 * | 3/2004 | Belchine, III | 16/386 |
| 7,341,144 | B2 * | 3/2008 | Tajiri et al. | 16/386 |

* cited by examiner

*Primary Examiner* — Jeffrey O'Brien
(74) *Attorney, Agent, or Firm* — Quinn Law Group, PLLC

(57) ABSTRACT

An assist handle includes a hinge and a bar having a global axis. The bar is rotatable about the global axis between a first position and a second position. A spring biases the bar toward the second position. A sleeve is defined by either the bar or hinge, and is generally aligned with the global axis. A pin is operatively attached to the other of the bar or hinge and is partially disposed within the sleeve. The pin is configured to allow rotation between the hinge and the bar. The pin includes a wide portion and an undercut portion smaller than the wide portion. The undercut portion creates at least one clearance region between the pin and the sleeve.

12 Claims, 4 Drawing Sheets

PIVOTING ASSIST HANDLE

TECHNICAL FIELD

This disclosure relates to assist handles for vehicles.

BACKGROUND

Motor vehicles and other transportation means such as airplanes, buses and trains have multiple handles, levers, hooks, and the like on the exterior and throughout the interior compartment. In motor vehicles, for instance, such devices have myriad uses, such as grab handles for assisting egress/ingress from the vehicle. The assist handles may be fully or partially retractable when not in use.

SUMMARY

An assist handle is provided, and includes a hinge and a bar having a global axis. The bar is rotatable about the global axis between a first position and a second position, different from the first position. A spring is configured to bias the bar toward the second position. A sleeve is defined by one of the bar and the hinge, and is generally aligned with the global axis. A pin is operatively attached to the other of the bar and the hinge and is partially disposed within the sleeve, such that the pin is configured to allow rotation between the hinge and the bar. The pin includes a wide portion and an undercut portion smaller than the wide portion. The undercut portion creates at least one clearance region between the pin and the sleeve.

The pin may be configured such that the wide portion is aligned nearer to a bias zone defined by the sleeve when the bar is in the first position than when the bar is in the second position. The pin may be further configured such that clearance region is aligned nearer to the bias zone defined by the sleeve when the bar is in the second position than when the bar is in the first position.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
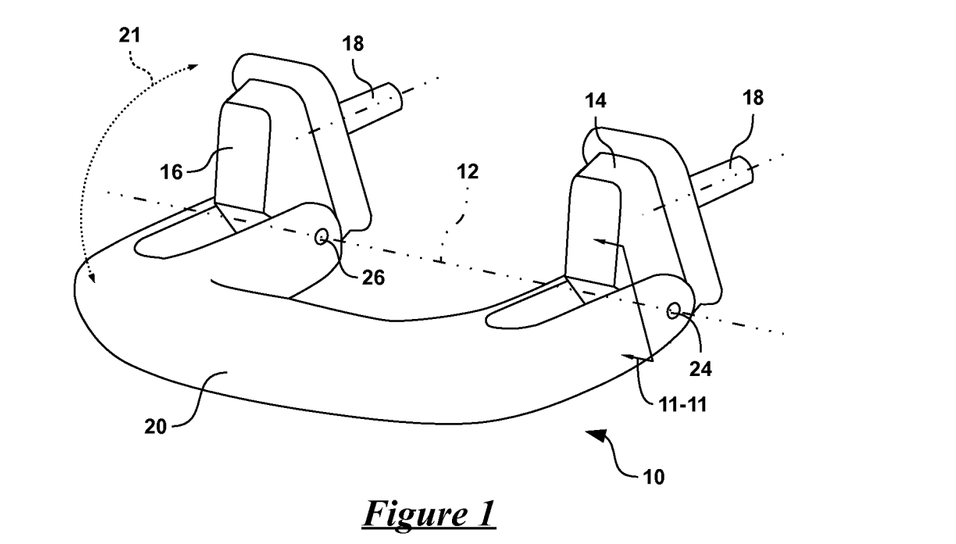
FIG. 1 is a schematic isometric view of an assist handle having a global axis, a bar of the assist handle is shown in an open position but is configured to rotate to a closed position.

Referring to the drawings, wherein like reference numbers correspond to like or similar components throughout the several figures, there is shown in FIG. 1 an assist handle 10 for use in a vehicle (not shown). The assist handle 10 defines a global axis 12 about which the assist handle 10 rotates or pivots. The assist handle 10 includes a first hinge 14 and a second hinge 16, which are attached or mated to the vehicle by one or more fasteners 18.

The assist handle 10 also includes a bar 20 rotatable about the global axis 12 between a first position, as shown in FIG. 1, and a second position, different from the first position. In the second position, the bar 20 is rotated generally along a path 21 approximately seventy-five to one hundred degrees clockwise (as viewed, approximately, in FIG. 1). In many configurations of the assist handle 10, the first position and the second position will be separated by at least ninety degrees.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

Figure 2:
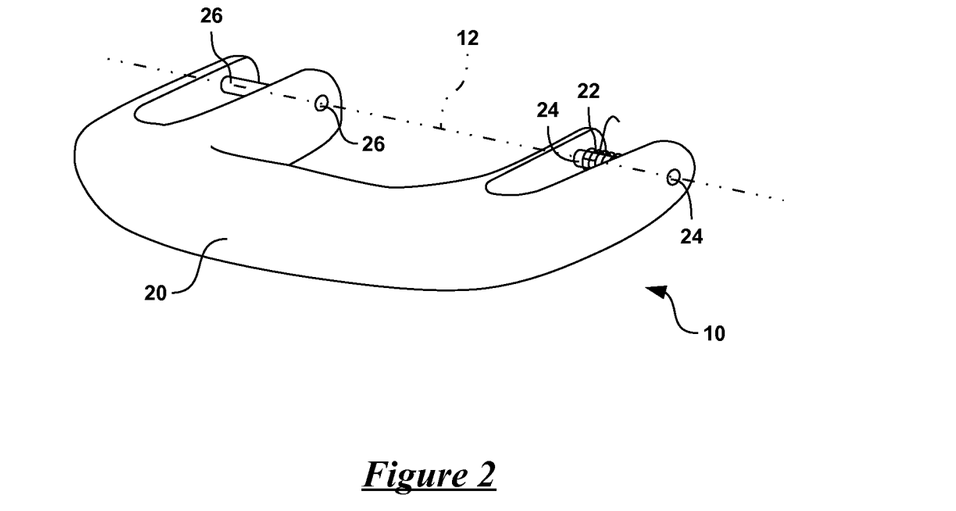
FIG. 2 is another schematic isometric view of the assist handle of FIG. 1, shown with hinges removed, such that a spring is viewable.

Referring now to FIG. 2, and with continued reference to FIG. 1, the assist handle 10 is shown with the first and second hinges 14, 16 removed. As shown in FIG. 2, the assist handle 10 includes a spring 22, which is configured to bias the bar 20 toward the second position. The assist handle 10 may further include additional springs 22, and may include a dampener (not shown) to slow the rotational speed of the bar 20 as it moves from the first to the second position.

The first position may be referred to herein as an open position, because the assist handle 10 is open and the bar 20 is away from the first and second hinges 14, 16. The first position may be utilized to assemble the assist handle 10 to the vehicle, and is also used when an occupant wishes to grasp or hold the bar 20. The second position may be referred to herein as a closed position, because the bar 20 is relatively nearer to the first and second hinges 14, 16 than when it is in the (first) open position. After the occupant releases the bar 20, the spring 22 biases the bar 20 toward the (second) closed position.

The assist handle 10 includes a first pin 24 operatively attached to the bar 20 and a second pin 26 operatively attached to the bar 20. As viewed in FIGS. 1 and 2, the first pin 24 may also be referred to as the right side pin and the second pin 26 may be referred to as the left side pin. The first pin 24 is at least partially disposed within a sleeve 30 (not shown in FIG. 2, partially shown in FIGS. 7 and 9) defined by the first hinge 14, and allows or facilitates rotation between the bar 20 and the first hinge 14. The second pin 26 is also at least partially disposed within the sleeve 30 defined by the second hinge 16, and allows or facilitates rotation between the bar 20 and the second hinge 16.

As described herein, the sleeves 30 are generally parallel with the global axis 12 but may be at an angle to the global axis 12. Both of the sleeves 30 are blocked from view in FIG. 1, and may be covered up by a cap covering the interior portions of the hinges 14, 16.

Figure 3:
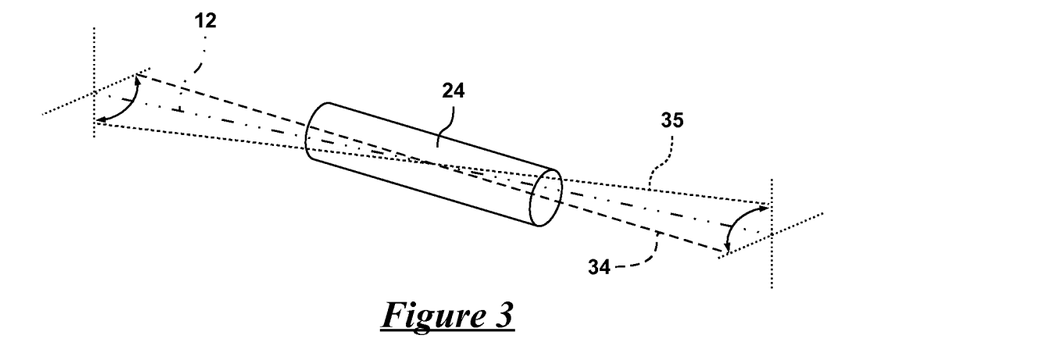
FIG. 3 is a schematic representation of a cylindrical pin usable for the assist handle of FIG. 1, showing the cylindrical pin having a pin angle error relative to the global axis while the bar is in the open position.
Figure 4:
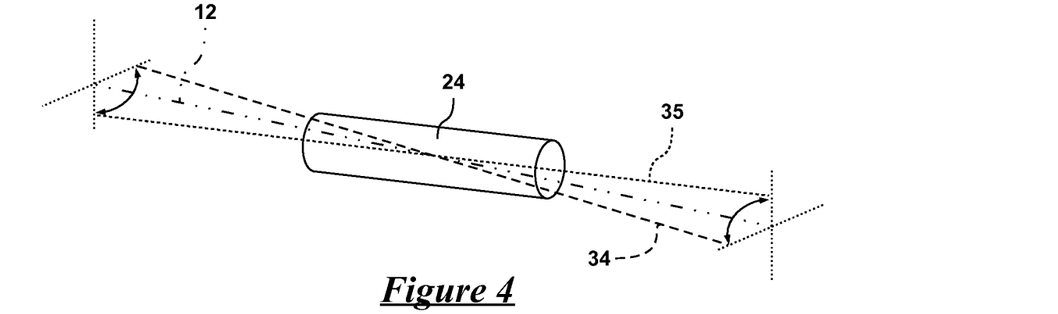
FIG. 4 is another schematic representation of the cylindrical pin shown in FIG. 3, showing the cylindrical pin and the pin angle error relative to the global axis while the bar is in the closed position.

Referring now to FIG. 3 and to FIG. 4, there are shown two illustrative, schematic views of the first pin 24. In FIGS. 3 and 4, the first pin 24 is shown as a cylindrical pin. FIG. 3 shows the first pin 24 while the bar 20 is in the open position and FIG. 4 shows the first pin 24 while the bar 20 is in the closed position. FIGS. 3 and 4 are illustrative of possible manufacturing variations, and the scale and details of FIGS. 3 and 4 may not be representative of any actual components of the assist handle 10.

The first and second pins 24, 26 each define a pin axis 34 (shown as a dashed line in FIGS. 3 and 4). If the bar 20 is manufactured ideally, the pin axes 34 will both be parallel to, and coincident with, the global axis 12. However, manufacturing and assembly variations may cause a pin angle error or wobble. As shown in FIG. 3, the pin axis 34 of the first pin 24 is not exactly coincident with the global axis 12. The difference between the pin axis 34 and the global axis 12 is the pin angle error.

Generally, the bar 20 rotates both the first pin 24 and the second pin 26 about the global axis 12. Therefore, as the bar 20 rotates, the pin axis 34 will also rotate. If there is pin angle error, the pin axis 34 and the first pin 24 will wobble as the bar 20 rotates. The first pin 24 may be rotating within a cylindrical housing (not shown, but such a housing may be incorporated into the first hinge 14) parallel with the global axis 12.

In FIG. 4, the first pin 24 is shown aligned with a rotated-pin axis 35 (shown as a fine dashed line in FIGS. 3 and 4). As the bar 20 moves from the open position to the closed position, the first pin 24 moves from being aligned with the pin axis 34 to the rotated-pin axis 35. If the first pin 24 is moving within relatively tight confines, this wobble may cause interference between the first pin 24 and the sleeve 30.

For example, if the first pin 24 is rotating within the cylindrical housing parallel with the global axis 12, the wobble caused by the pin angle error may cause the ends of the first pin 24 to rotate into contact with the cylindrical housing. If the pin axis 34 is perfectly coincident with the global axis, the rotation of the first pin 24 will not change the location of the first pin 24 relative to the cylindrical housing.

Figure 5:
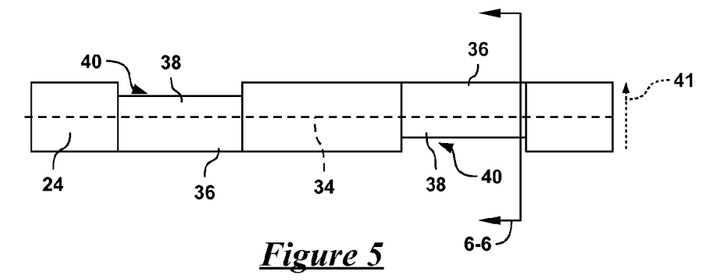
FIG. 5 is a schematic plan view of a first pin usable with the assist handle of FIG. 1.
Figure 6:
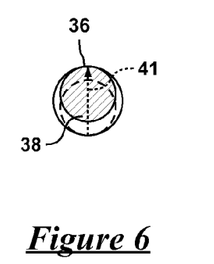
FIG. 6 is a schematic cross-sectional view of the first pin shown in FIG. 5, as viewed from line 6-6.

Referring now to FIG. 5 and to FIG. 6, and with continued reference to FIGS. 1-4, there are shown two more-detailed views of the first pin 24. FIG. 5 shows a plan view of the first pin 24, and FIG. 6 shows a schematic cross-sectional view of the first pin 24, as viewed from line 6-6. Line 6-6 is located in a similar position to a section line 11-11 shown in FIG. 1, but the line 6-6 is rotated slightly about the global axis 12. Although not shown in FIGS. 5 and 6, the second pin 26 may be very similar to the first pin 24 shown.

Each of the first pin 24 and the second pin 26 has a wide portion 36 and an undercut portion 38 smaller than the wide portion 36. The first pin 24 is not symmetric about the pin axis 34. As best viewed in FIG. 6, the undercut portion 38 is a cam lobe offset from the pin axis 34. As shown in the following figures, the undercut portion 38 creates at least one clearance region 40 between the first and second pins 24, 26 and the sleeves 30. A reference arrow 41 is illustrative only and shows the alignment of the first pin 24 in FIGS. 5 and 6.

The wide portion 36 of the first pin 24 may be a first wide portion 36 located on a first end (the right side, as viewed in FIG. 5) of the first pin 24 and the undercut portion 38 may be a first undercut portion 38 located on the first end of the first pin 24. Therefore, the first pin 24 may also include a second wide portion 36 located on a second end (the left side, as viewed in FIG. 5) of the pin, wherein the second wide portion 36 is oriented substantially one hundred and eighty degrees of rotation about the global axis 12 relative to the first wide portion 36.

Similarly, the first pin 24 may also include a second undercut portion 38 located on the second end of the pin, wherein the second undercut portion 38 is oriented substantially one hundred and eighty degrees of rotation about the global axis 12 relative to the first undercut portion 38. The second undercut portion 38 is viewable in FIG. 6 as a dashed line (it would otherwise be hidden from view).

Figure 7:
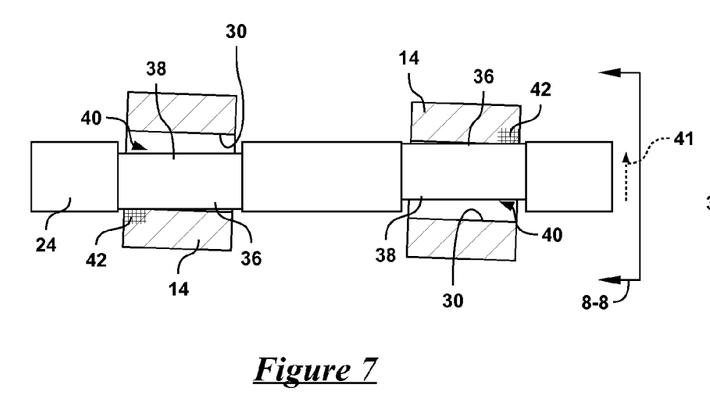
FIG. 7 is another schematic plan view of the first pin shown in FIG. 5 and disposed within a sleeve of an illustrative hinge, such as that shown in FIG. 1, the first pin being rotated relative to one or more bias zones defined by the sleeve while the bar is in the open position.
Figure 8:
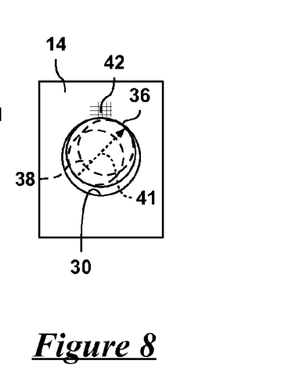
FIG. 8 is a schematic side view of the first pin and hinge shown in FIG. 7, as viewed from line 8-8 of FIG. 7.

Referring now to FIGS. 7 and 8, to FIGS. 9 and 10, and with continued reference to FIGS. 1-6, there are shown additional views of the first pin 24. FIG. 7 shows an illustrative plan view of the first pin 24 partially disposed with the sleeve 30 of the first hinge 14. FIG. 7 shows the first pin 24 while the bar 20 is in the open position, as shown in FIGS. 1 and 2. FIG. 8 shows a side view of the first pin 24 and the portion of the first hinge 14 shown in FIG. 7, as viewed from line 8-8.

In this configuration, the sleeve 30 is separated into two cylindrical sections and is also shown as a cross section in FIG. 7 to better illustrate the interaction between the sleeve 30 and the first pin 24. The sleeve 30 may be one continuous cylinder. The remainder of the first hinge 14 is hidden from view in FIGS. 7 and 9, but may be identical to that shown in FIG. 1.

Figure 9:
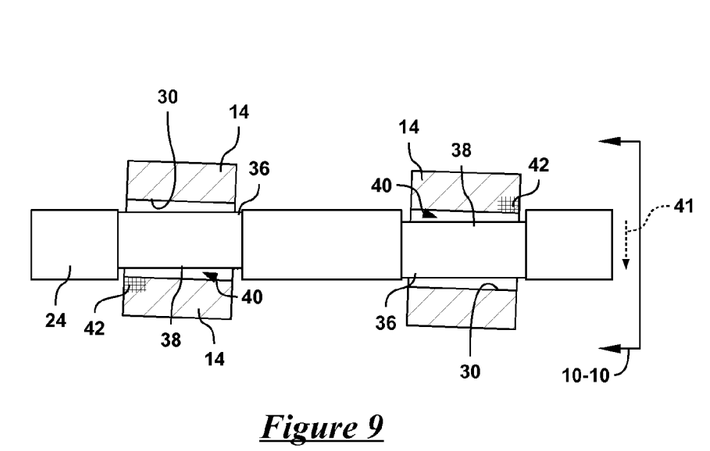
FIG. 9 shows the same view as FIG. 7, except that the first pin is shown while the bar is in the closed position.
Figure 10:
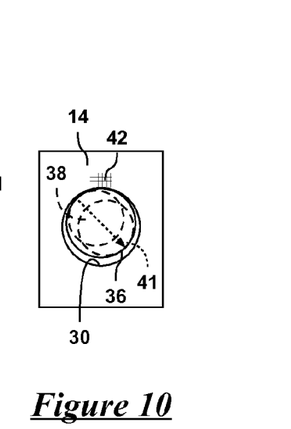
FIG. 10 shows the same side view as FIG. 8, except that the first pin is shown while the bar is in the closed position, as viewed from line 10-10 of FIG. 9.

FIGS. 9 and 10 show the same views as those shown in FIGS. 7 and 8, respectively. However, in FIGS. 9 and 10, the first pin 24 has rotated to coincide with the position of the first pin 24 when the bar 20 is in the closed position, which is rotated approximation ninety degrees clockwise from the position shown in FIGS. 1 and 2, and also in FIGS. 7 and 8.

As shown in FIGS. 7 and 8, the first pin 24 is oriented at an approximately forty-five degree angle to the bar 20. This angle is also viewable as approximately forty-five degrees of rotation from the views shown in FIGS. 5 and 6. The relative rotation is also represented by rotation of the reference arrow 41.

The sleeve 30 shown in FIG. 7 and FIG. 9 is rotated slightly. This rotation is illustrative of the tendency of the first hinge 14 (and also the second hinge 16) to rotate or to experience a torque preload during assembly of the assist handle 10. As shown in FIG. 1, fasteners 18 may be used to secure the assist handle 10 to the vehicle. During assembly the fasteners 18 are subjected to torque, which may then be translated into the first and second hinges 14, 16. If the fasteners 18 are right-handed bolts, screws or other fastening components, the first and second hinges 14, 16 may have a tendency to rotate clockwise about the fasteners 18. This rotational tendency is shown as a clockwise rotation in FIG. 7 and FIG. 9, but the amount of rotation shown is likely much exaggerated.

Both portions of the sleeve 30 of the first hinge 14 are shown with a bias zone 42. The bias zones 42 may be caused by the torque preload transferred during assembly of the fasteners 18. The bias zones 42 may or may not actually include material in contact with the first pin 24 or the second pin 26. However, manufacturing variations may cause the bias zones 42 to contact either the first pin 24 or the second pin 26. The locations of the bias zones 42 for this configuration of the assist handle 10 are shown as a hatched area in the figures. The bias zones 42 shown are illustrative only and do not represent physical bosses or protrusions from the (generally-cylindrical) sleeves 30 or the first hinge 14. Use of left-handed fasteners or of a different assembly process for the assist handle 10 may alter the location the bias zones 42.

Comparison between FIGS. 7 and 8 and FIGS. 9 and 10 show the difference between alignment of the first pin 24 as the bar 20 moves or rotates from the open position to the closed position. The second pin 26 may be identical to the first pin 24 shown in the figures. However, the second pin 26 may also be oriented at a substantially one hundred and eighty degree angle to the first pin 24. As viewed in FIGS. 7-10, the first and second pins 24, 26 are configured such that the wide portions 36 are aligned nearer to the bias zones 42 defined by the sleeves 30 when the bar 20 is in the open position (FIGS. 7 and 8) than when the bar 20 is in the closed position (FIGS. 9 and 10).

By aligning the wide portions 36 nearer the bias zones 42, the first and second pins 24, 26 help to react the torque created during assembly of the assist handle 10 to the vehicle. Therefore, while in the open position, the first and second pins 24, 26 are assisting in prevention of the misalignment of the first and second hinges 14, 16 by reacting against rotation of the first and second hinges 14, 16. The first and second pins 24, 26 are acting as a mounting jig or apparatus for the first and second hinges 14, 16.

Additionally, as viewed in FIGS. 7-10, the first and second pins 24, 26 are configured such that the clearance regions 40 are aligned nearer to the bias zones 42 defined by the sleeves 30 when the bar 20 is in the closed position than when the bar 20 is in the open position. Therefore, as the bar 20 rotates into the closed position, the clearance regions 40 reduce the likelihood of contact, friction, or drag between the first and second pins 24, 26 and the sleeves 30.

Friction between the first and second pins 24, 26 and the sleeves 30 may generate sufficient negative torque—torque that opposes rotation from the first to the closed position—to significantly slow, or even stop, rotation of the bar 20 into the closed position. As the bar 20 moves from the open position to the closed position, the torque generated by the spring 22 decreases because the displacement of the spring 22 is decreasing. Therefore, the effects of frictional drag between the first and second pins 24, 26 and the sleeves 30 is greater as the bar 20 nears the closed position.

Frictional drag between the first and second pins 24, 26 and the sleeves 30 is not, however, the only mechanism by which the assist handle 10 may be prevented or limited from moving from the open position to the closed position. As shown in FIGS. 3 and 4, pin angle error may also cause the first and second pins 24, 26 to wobble as the bar 20 is rotated from the open position to the closed position.

In addition to being likely to cause frictional drag, the bias zones 42 are also the portions of the sleeves 30 which tend to be rotated into the path of the first and second pins 24, 26 having pin angle error as the either the first pin 24 or the second pin 26 moves into the closed position. Pin angle error is the offset or wobble of the first and second pins 24, 26 relative to the global axis 12, such that if the first and second pins 24, 26 are perfectly parallel with the global axis 12, there is no pin angle error.

The bias zones 42 may or may not actually include material being disposed in the path of the rotating first and second pins 24, 26. However, the bias zones 42 are still the location of likely contact or interference between the first and second pins 24, 26 and the sleeves 30 as the first and second pins 24, 26 rotate into the closed position. Therefore, the bias zones 42 represent areas which the first and second pins 24, 26 need to avoid coming into contact as the first and second pins 24, 26 rotate into the closed position, to either reduce frictional drag or avoid interference contact.

Interference contact may generate sufficient negative torque—torque that opposes rotation from the first to the closed position—to stop rotation of the bar 20 into the closed position. Different from frictional torque imparted by assembly with the fasteners 18, the torque created by pin angle error is mostly interference torque as the first and second pins 24, 26 impact the sleeves 30 and try to move into the bias zones 42.

When viewed at the right side (relative to the mounting surface or the attachment plane of the vehicle and as viewed in FIG. 7 and FIG. 9) of the assist handle 10, the bias zone 42 is the upper edge of the sleeve 30. Similarly, when viewed at the left side (relative to the mounting surface or attachment plane) of the assist handle 10, the bias zone 42 is the lower edge of the sleeve 30.

The undercut portions 38, and the clearance regions 40 created therefrom, may also reduce the likelihood of interference between the first and second pins 24, 26 and the sleeves 30. If the pin angle error tends to cause the interference with the sleeves 30 when the bar is rotated to the closed position, rotation of the clearance regions 40 nearer to the bias zones 42 may prevent the interference from occurring due to wobble of the first and second pins 24, 26 about the global axis 12 (as illustrated in FIGS. 3 and 4).

Unlike the friction torque transferred as drag between the sleeves 30 and the first and second pins 24, 26, the interference torque created by pin angle error may not be in a consistent direction or location. This variability occurs as a result of variability in pin angle error. The pin angle error shown in FIGS. 3 and 4 is likely to cause interference between the first pin 24 and the sleeve 30 as the bar 20 rotates from the open position to the closed position, especially when combined with a clockwise bias or tilt in the first hinge 14—this may be referred to as a bad pin angle error. Alternatively, a different pin angle error may actually create clearance between the first pin 24 and the sleeve 30 during the same rotation—this may be referred to as a harmless pin angle error. Therefore, the bias zones 42 are defined by the likely problem areas (those that may combine with bad pin angle error to stop rotation of the bar 20) and remain located in the same area of the sleeves 30 for either friction torque or interference torque.

When the bar 20 is in the open position, the torque from the spring 22 is at its greatest, such that there may be sufficient spring torque to overcome any interference and interaction between the first and second pins 24, 26 and the sleeves 30, regardless of the type of pin angle error involved. Conversely, when the bar 20 is at or near the closed position, the torque from the spring 22 is relatively lower. Therefore, if bad pin angle error creates interference as the bar 20 rotates the first and second pins 24, 26 into the closed position, the spring 22 is providing less torque as the interference is increasing. The undercut portions 38 are located and oriented on the first and second pins 24, 26 to overcome both frictional torque and interference torque from manufacturing issues which are located at similar areas of the sleeves 30 (e.g. the bias zones 42) as the bar 20 approaches the closed position.

Much of the description herein assumes that the first and second pins 24, 26 are mated or fixed directly to the bar 20 and that the sleeves 30 are portions of the first and second hinges 14, 16. However, the sleeves 30 may actually be defined in either the bar 20 or the first and second hinges 14, 16—or the first hinge 14 if the assist handle 10 has only one single hinge. In such a configuration, the first pin 24 and the second pin 26 would be operatively attached to the other of the bar 20 and the first and second hinges 14, 16. Therefore, the first and second pins 24, 26 may be mated to, and rotated with, either the bar 20 or the first and second hinges 14, 16. In either configuration, the first and second pins 24, 26 are partially disposed within the sleeves 30, such that the first and second pins 24, 26 are configured to allow rotation between the first and second hinges 14, 16 and the bar 20.

Figure 11:
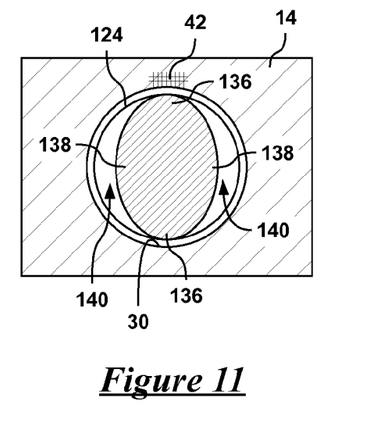
FIG. 11 shows a schematic cross-sectional view of another first pin disposed within a hinge having a circular sleeve, taken along line 11-11 of FIG. 1, the first pin is shown while the bar is in the open position.
Figure 12:
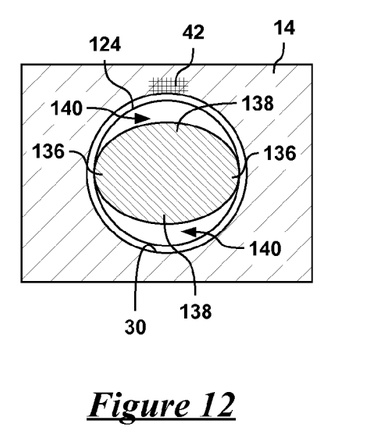
FIG. 12 shows the same illustrative view as FIG. 11, except that the first pin is shown while the bar is in the closed position.

Referring now to FIGS. 11 and 12, and with continued reference to FIGS. 1-10, there is shown a cross-sectional view of a first pin 124 usable with the assist handle 10 and bar 20 shown in FIG. 1. FIGS. 11 and 12 are taken along the line 11-11 in FIG. 1. FIG. 11 shows the first pin 124 while the bar 20 is in the open position, and FIG. 12 shows the first pin 124 while the bar 20 is in the closed position.

The first pin 124 is disposed within the first hinge 14, which has the circular or cylindrical sleeve 30. The components shown in FIGS. 11 and 12 are illustrative only and the relative sizes of the first pin 124 and the sleeve 30 may not be shown to scale, such that the clearance between the first pin 124 and the sleeve 30 may be exaggerated.

The first pin 124 includes two wide portions 136 and two undercut portions 138 defining two clearance regions 140. The entire length of the first pin 124 may be shaped identically with the wide portions 136 and the undercut portions 138, or segments of the first pin 124—particularly the end, or ends, which are mated to the bar 20—may be cylindrical. A second pin (not shown) may be identical to the first pin 124.

When the bar 20 is in the open position, as shown in FIG. 11, the wide portions 136 are aligned with the bias zones 42 defined by the sleeve 30. The bar 20 may be placed into the open position for assembly of the assist handle 10 to the vehicle. With the wide portions 136 aligned with bias zone 42, the first pin 124 may counteract or react torque introduced to the first hinge 14 by the fastener 18. Additionally, the first pin 124 helps to align the first hinge 14 in preparation for the assembly process and attachment with the fastener 18.

As the bar 20 rotates into the closed position, the first pin 124 rotates the undercut portions 138 and the clearance regions 140. Therefore, the first pin 124 (and also the second pin) is configured such that the clearance regions 140 are aligned with the bias zone 42 defined by the sleeve 30 when the bar 20 is in the closed position. The clearance regions 140 reduce the amount and likelihood of friction torque being introduced between the first pin 124 and the sleeve 30 as the bar 20 and first pin 124 rotate to the closed position. Furthermore, the clearance regions 140 reduce the amount and likelihood of interference torque caused by pin angle error being introduced by contact between the first pin 124 and the sleeve 30 as the bar 20 and first pin 124 rotate to the closed position.

Figure 13:
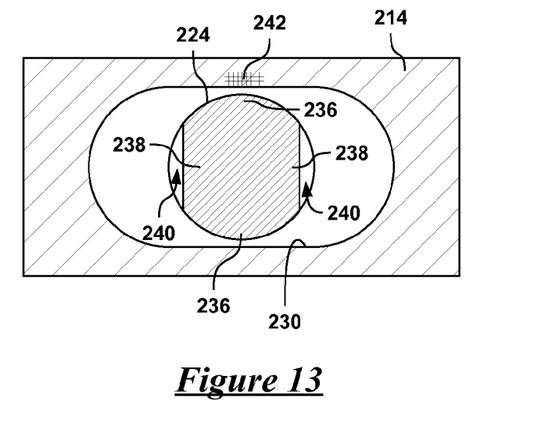
FIG. 13 shows a schematic cross-sectional view of yet another first pin disposed within a hinge having a sleeve with an elongated slot, taken along line 11-11 of FIG. 1, the first pin is shown while the bar is in the open position.
Figure 14:
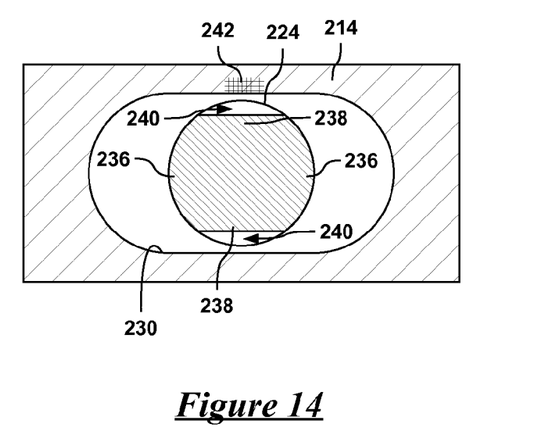
FIG. 14 shows the same illustrative view as FIG. 13, except that the first pin is shown while the bar is in the closed position.

Referring now to FIGS. 13 and 14, and with continued reference to FIGS. 1-12, there is shown a cross-sectional view of a first pin 224, which is also usable with the assist handle 10 and bar 20 shown in FIG. 1. FIGS. 13 and 14 are also taken along the line 11-11 in FIG. 1. FIG. 13 shows the first pin 224 while the bar 20 is in the open position, and FIG. 14 shows the first pin 224 while the bar 20 is in the closed position.

The first pin 224 is disposed within a first hinge 214. Unlike the first hinge 14, the first hinge 214 has a sleeve 230 that is an elongated slot oriented substantially parallel to the fastener 18. Alternatively stated, the elongated slot may be substantially parallel to the bar 20 when in the open position. The components shown in FIGS. 13 and 14 are illustrative only and the relative sizes of the first pin 224 and the sleeve 230 may not be shown to scale, such that the clearance between the first pin 224 and the sleeve 230 may be exaggerated.

The first pin 224 includes two wide portions 236 and two undercut portions 238 defining two clearance regions 240. The undercut portions 238 are planar surfaces on opposing sides of the first pin 224. The entire length of the first pin 224 may be shaped identically with the wide portions 236 and the undercut portions 238, or segments of the first pin 224—particularly the end, or ends, which are mated to the bar 20—may be cylindrical. A second pin (not shown) may be identical to the first pin 224.

The open position of the bar 20, as shown in FIG. 13, aligns the pair of surfaces of the undercut portions 238 of the first pin 224 substantially perpendicular to the elongated slot of the sleeve 230. The closed position of the bar 20 aligns the pair of surfaces of the undercut portions 238 of the first pin 224 substantially parallel to the elongated slot of the sleeve 230.

When the bar 20 is in the open position, as shown in FIG. 13, the wide portions 236 are aligned with the bias zone 242 defined by the sleeve 230 when the bar 220. The bar 20 may be placed into the open position for assembly of the assist handle 10 to the vehicle. With the wide portions 236 aligned with bias zone 242, the first pin 224 may counteract or react torque introduced to the first hinge 214 by the fastener 18. Additionally, the first pin 224 helps to align the first hinge 214 in preparation for the assembly process and attachment with the fastener 18.

As the bar 20 rotates into the closed position, as shown in FIG. 14, the first pin 224 rotates the undercut portions 238 and the clearance regions 240. Therefore, the first pin 224 (and also the second pin) is configured such that the clearance regions 240 are aligned with the bias zone 242 defined by the sleeve 230 when the bar 20 is in the closed position. The clearance regions 240 reduce the amount and likelihood of friction torque being introduced between the first pin 224 and the sleeve 230 as the bar 20 and first pin 224 rotate to the closed position. Furthermore, the clearance regions 240 reduce the amount and likelihood of interference torque caused by pin angle error being introduced by contact between the first pin 224 and the sleeve 230 as the bar 20 and first pin 224 rotate to the closed position.

When the bar 20 is in the open position, shown in FIG. 13, an occupant may be applying force to the assist handle 10. The ends of the elongated slot formed by the sleeve 230 are similar in profile to the edges of the wide portions 236. Therefore, the first pin 224 may slide to the ends of the elongated slot and evenly-distribute force between the contacting areas of the wide portions 236 and the sleeve 230 and the first hinge 214.

Figure 15:
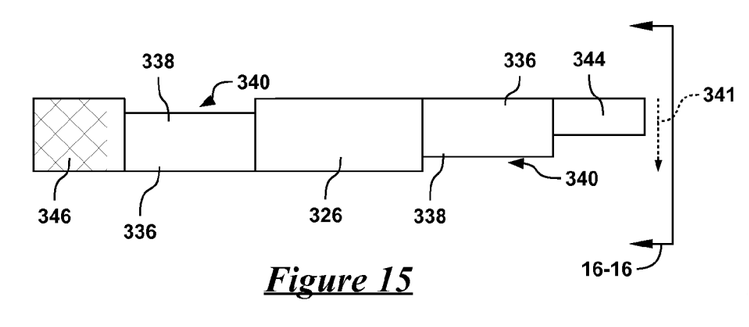
FIG. 15 is a schematic plan view of a second pin, which is similar to the first pin shown in FIG. 5 but includes a locating feature.
Figure 16:
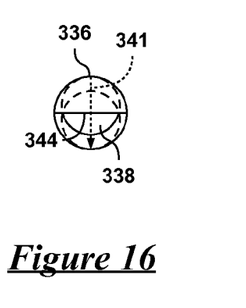
FIG. 16 is a schematic side view of the second pin shown in FIG. 15, as viewed from line 16-16 of FIG. 15.

Referring now to FIGS. 15 and 16, and with continued reference to FIGS. 1-14, there are shown two views of a second pin 326, which is also usable with the assist handle 10 and bar 20 shown in FIG. 1. FIG. 15 shows a plan view of the second pin 326, similar to the plan view of the first pin 24 shown in FIG. 5. FIG. 16 shows a side view of the second pin 326 viewed from a line 16-16, similar to the side view of the first pin 24 shown in FIG. 6. FIGS. 15 and 16 also show a reference arrow 341, which is illustrative only and shows the alignment of the second pin 326 in FIGS. 15 and 16. The second pin 326 includes two wide portions 336 and two undercut portions 338 defining two clearance regions 340. FIGS. 15 and 16 also demonstrate features usable to assist in assembly and manufacture of the assist handle 10.

As discussed regarding the first pin 24, the assist handle 10 may include the second pin 26 (shown in FIGS. 1 and 2), which may be substantially identical to the corresponding first pin 24. Although identical, the second pin 26 may need to be mated to the bar 20 at substantially one-hundred eighty degrees to the first pin 24.

For example, as viewed in FIG. 1, the first pin 24 may be inserted from right to left along the global axis 12 and the second pin 26 may be inserted from left to right along the global axis 12—this may be referred to as an outside-in assembly. In order to align the first pin 24 with the bias zones 42 of the first hinge 14 and to align the second pin 26 with the bias zones 42 of the second hinge 16, the first and second pins 24, 26 need to be rotated one-hundred eighty degrees relative to each other (and the first pin 24 needs to be rotated forty-five degrees relative to the drive direction of the fasteners 18).

Alternatively, both the first pin 24 and the second pin 26 may be inserted from the same direction, e.g. right-to-left or left-to-right assembly. If single direction assembly is used, the first pin 24 and the second pin 26 may be oriented identically to each other. However, other features of the first pin 24 and the second pin 26, such as knurling (described herein and shown in FIG. 15) intended to face outward may need to be moved as a result. Therefore, the first and second pins 24, 26 may be identical (but rotated during outside-in assembly) or may be different (but capable of being assembled from a single direction).

As shown in FIGS. 15 and 16, the second pin 326 includes a locating feature 344 configured to align the second pin 326 relative to the bias zone 42 of the first hinge 14. On the second pin 326 shown in FIGS. 15 and 16, the locating feature 344 is a D-shaped boss. When mated to a D-shaped slot or hole (not shown) in the bar 20 the second pin 326 will be insertable or matable in only one direction. Similarly, the corresponding first pin may then be mated to a D-shaped hole rotated one-hundred eighty degrees about the global axis 12, both the first pin and the second pin 326 will be matable in the correct orientations relative to the bar 20 and relative to each other. Other locating features may be used to orient the second pin 326, such as (and without limitation), a key and key hole.

The second pin 326 also includes knurling 346 on the left side. The second pin 326 may be pressed into a corresponding hole in the bar 20, either with a press fit or slip fit interface. The knurling 346 prevents retraction of the second pin 326 from the bar 20, and also operates as another locating feature by identifying which end of the second pin 326 faces outward. Note that for outside-in assembly, if the first pin 24 shown in FIGS. 5, 7 and 9 included knurling, it would be on the far right end (as viewed in the figures), to help lock the first pin 24 into the outside edge of the bar 20.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An assist handle comprising:
   a hinge;
   a bar having a global axis and rotatable about the global axis between a first position and a second position, different from the first position;
   a spring configured to bias the bar toward the second position;
   a sleeve defined by one of the bar and the hinge, and generally aligned with the global axis; and
   a pin operatively attached to the other of the bar and the hinge and partially disposed within the sleeve, such that the pin is configured to allow rotation between the hinge and the bar, wherein the pin includes:
      a wide portion; and
      an undercut portion smaller than the wide portion, such that the undercut portion creates at least one clearance region between the pin and the sleeve;
   wherein the pin is configured such that the clearance region is aligned with a bias zone defined by the sleeve when the bar is in the second position; and
   wherein the pin is configured such that the wide portion is aligned with the bias zone defined by the sleeve when the bar is in the first position;
   wherein the bias zone is an area of high concentration of interference between the pin and the sleeve caused by a torque preload on the hinge during assembly.

2. The assist handle of claim 1, wherein the first position and the second position are separated by at least ninety degrees.

3. The assist handle of claim 1, wherein the pin defines a pin axis and the undercut portion is a cam lobe offset from the pin axis.

4. The assist handle of claim 3, wherein the wide portion of the pin is a first wide portion located on a first end of the pin and the undercut portion is a first undercut portion located on the first end of the pin, and wherein the pin further includes: a second wide portion located on a second end of the pin, wherein the second wide portion is oriented substantially one hundred and eighty degrees of rotation about the global axis relative to the first wide portion; and a second undercut portion located on the second end of the pin, wherein the second undercut portion is oriented substantially one hundred and eighty degrees of rotation about the global axis relative to the first undercut portion.

5. The assist handle of claim 4, wherein the pin further includes a locating feature configured to align the pin relative to the bias zone.

6. The assist handle of claim 1, wherein the undercut portion includes a pair of surfaces on opposing sides of the pin, and at least two clearance regions are created by the undercut portion.

7. The assist handle of claim 6, wherein the hinge mates with a fastener, wherein the sleeve is an elongated slot oriented substantially parallel to the fastener, wherein the bar is oriented substantially parallel to the elongated slot in the first position, wherein the first position of the bar is configured to align the pair of surfaces of the pin substantially perpendicular to the elongated slot, and wherein the second position of the bar is configured to align the pair of surfaces of the pin substantially parallel to the elongated slot.

8. An assist handle defining a global axis comprising:
   a first hinge and a second hinge;
   a bar rotatable about the global axis between a first position and a second position, different from the first position;
   a spring configured to bias the bar toward the second position;

a first sleeve defined by the first hinge and a second sleeve defined by the second hinge, wherein the first hinge and the second hinge are generally parallel with the global axis; and a first pin operatively attached to the bar and partially disposed within the first sleeve, and a second pin operatively attached to the bar and partially disposed within the second sleeve, such that the first pin allows rotation between the bar and the first hinge and the second pin allows rotation between the bar and the second hinge, wherein the first pin and the second pin each include:

a wide portion; and an undercut portion smaller than the wide portion, such that the undercut portion creates at least one clearance region between the first and second pins and the first and second sleeves, respectively;

wherein the first and second pins are configured such that the wide portions are aligned with a bias zone defined by the sleeve when the bar is in the first position; and wherein the first and second pins are configured such that the clearance regions are aligned with the bias zone defined by the sleeve when the bar is in the second position;

wherein the bias zone is an area of high concentration of interference between the pin and the sleeve caused by a torque preload on the hinge during assembly.

9. The assist handle of claim 8, wherein the first and second pins each define a pin axis, and wherein the undercut portion is a cam lobe offset from the pin axis.

10. The assist handle of claim 8, wherein the first and second pins further include a locating feature configured to align the first and second pins relative to the bias zone.

11. The assist handle of claim 8, wherein the first pin is oriented at an approximately forty-five degree angle to the bar, and wherein the second pin is oriented at a substantially one hundred and eighty degree angle to the first pin.

12. The assist handle of claim 11, wherein the first position and the second position are separated by at least ninety degrees.

\* \* \* \* \*